US009582939B2

United States Patent
Zhang et al.

(10) Patent No.: US 9,582,939 B2
(45) Date of Patent: Feb. 28, 2017

(54) STRUCTURE PRESERVED POINT CLOUD SIMPLIFICATION

(71) Applicant: Nokia Technologies Oy, Espoo (FI)

(72) Inventors: Xi Zhang, Chicago, IL (US); Xin Chen, Evanston, IL (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/736,476

(22) Filed: Jun. 11, 2015

(65) Prior Publication Data

US 2016/0364917 A1 Dec. 15, 2016

(51) Int. Cl.
G06K 9/50 (2006.01)
G06T 19/20 (2011.01)
G06K 9/64 (2006.01)
G06T 7/00 (2006.01)
G06K 9/46 (2006.01)

(52) U.S. Cl.
CPC ............ G06T 19/20 (2013.01); G06K 9/4604 (2013.01); G06K 9/64 (2013.01); G06T 7/0051 (2013.01); G06T 2207/10028 (2013.01)

(58) Field of Classification Search
CPC ............ G06K 9/00201; G06K 9/6202; G06K 9/6271; G06T 7/0046; H04N 13/0203; H04N 13/0275
USPC .......................................................... 382/201
See application file for complete search history.

(56) References Cited

U.S. PATENT DOCUMENTS

2013/0144574 A1* 6/2013 Park ........................ G06F 17/10
703/2

2013/0321393 A1 12/2013 Winder
2015/0288947 A1* 10/2015 Ahrns ................... G06K 9/6202
348/46

FOREIGN PATENT DOCUMENTS

CN 103530899 1/2014

OTHER PUBLICATIONS

Benhabiles et al., Fast Simplification with Sharp Feature Preserving for 3D Point Clouds, Apr. 22-24, 2013, pp. 47-52, Programming and Systems (ISPS), 2013 11th International Symposium on. IEEE.
Cao et al., Local and Global Point Samling for Structured Point Cloud Simplification, 2012, Fuzzy Systems and Knowledge Discovery.

(Continued)

*Primary Examiner* — Manuchehr Rahmjoo
(74) *Attorney, Agent, or Firm* — Lempia Summerfield Katz LLC

(57) ABSTRACT

Systems, methods, and apparatuses are disclosed for simplifying a point cloud. A point cloud is received where the point cloud has a plurality of points, a global spatial structure, and a local point density. The processor calculates a set of pairwise distances for the plurality of points to at least one other point in the plurality of points. A first distance matrix is generated using the set of pairwise distances. The processor calculates a second pairwise distance set where the plurality of points have a weight and generates a second distance matrix based off the second pairwise distance set. A portion of the points in the second pairwise distance set are removed based on the weight. The processor performs a comparison of the two matrices using the comparison and the global spatial structure and the local point density, and generates a second point cloud based on the second distance matrix.

20 Claims, 9 Drawing Sheets

(56) References Cited

OTHER PUBLICATIONS

Nguyen et al., Simplification of 3D Point Clouds Sampled from Elevation Surfaces, 2013, Aix Marseille University.
Osada et al., Shape Distributions, Oct. 2002, pp. 807-832, vol. 21, No. 4, ACM Transactions on Graphics (TOG).
Pauly et al., Efficient Simplification of Point-Sampled Surfaces, 2002, Proceedings of the Conference on Visualization '02.
Westaway et al., Simplification Algorithm for Airborne Point Clouds, Accessed Apr. 23, 2015, University of Cape Town.

\* cited by examiner

202

| | A | B | C |
|---|---|---|---|
| A | 0 | 2 | 6 |
| B | 2 | 0 | 3 |
| C | 6 | 3 | 0 |

204 → A
206

208

| | A, w=0 | B, w=1 | C, w=1 |
|---|---|---|---|
| A, w=0 | 0 | 2 | 6 |
| B, w=1 | 2 | 0 | 3 |
| C, w=1 | 6 | 3 | 0 |

STRUCTURE PRESERVED POINT CLOUD SIMPLIFICATION

FIELD

The following disclosure relates to point clouds, and simplifying a point cloud, while maintaining the point cloud structure.

BACKGROUND

Point clouds have been extensively used in many applications including for example, object reconstruction, and object recognition. A common use for point clouds involves gathering data using Light Detection and Ranging (LiDAR) point clouds such as, street side view point LiDAR data, which have become a very informative data source for the on-board recognition of an autonomous vehicle. Such recognition may be based on matching incoming data with pre-processed data stored in a repository or memory.

Most techniques simplify point clouds by either randomly simplifying the point cloud or reconstructing the point cloud to a mesh first and simplifying the point cloud based on mesh. One technique that can work on a point cloud directly is called furthest point cloud sampling. However, this technique does not take into account local density of the point cloud, thus resulting in an almost uniform sampling in the simplification.

Simplification of point cloud data, such as uniform simplification or random sampling, changes the appearance of the original data to some extent, which causes information loss. This information loss may lead to the simplified point cloud not sharing the same characteristics as the original point cloud.

SUMMARY

Systems, methods, and apparatuses are disclosed which receive a point cloud distribution and simplify that point cloud distribution. A system receives a point cloud where the point cloud has a plurality of points, a global spatial structure, and a local point density. The system processor calculates a set of pairwise distances for the plurality of points to at least one other point in the plurality of points. A first distance matrix is generated using the set of pairwise distances. The processor calculates a second pairwise distance set where the plurality of points have a weight and generates a second distance matrix based off the second pairwise distance set. A portion of the points in the second pairwise distance set are removed based on the weight. The processor performs a comparison of the two matrices using the comparison and the global spatial structure and the local point density, and generates a second point cloud based on the second distance matrix.

In one embodiment, a method receives a first point cloud distribution. The point cloud distribution includes a plurality of points, a global spatial structure and a local point density. The method may calculate a first pairwise distance set for the plurality of points to at least one other point in the plurality of points. The method may generate a first distance matrix. The first distance matrix includes entries that correspond to the first pairwise distance set. The method may calculate a second pairwise distance set for the plurality of points to at least one other point in the plurality of points. The plurality of points used for the second pairwise distance set have a weight associated with them. The method may generate a second distance matrix. The second distance matrix includes entries that correspond to the second pairwise distance set. The method may remove a portion of the points in the second pairwise distance set based on the weight of the at least one point in the plurality of points. The method may perform a comparison of the first distance matrix and the second distance matrix, wherein the comparison uses the global spatial structure and the local point density. The method may construct a second point cloud distribution using the comparison and the second distance matrix, and provide the second point cloud distribution to a user, system, or other method.

In another embodiment, an apparatus including at least one processor, and at least one memory including computer program code for one or more programs, the at least one memory and the computer program code configured to, with the at least one processor, cause the apparatus to at least perform a series of acts which simplify a point cloud. The acts may include receiving a first point cloud, wherein the first point cloud includes a plurality of points, a global structure and a local density. The processor may calculate a first distance set for the plurality of points to at least one other point in the plurality of points. The processor may generate, a first matrix, wherein the first matrix includes entries that correspond to the first distance set. The processor may assign a weight to the at least one point in the plurality of points. The processor may calculate a second distance set for the at least one point in the plurality of points to at least one other point in the plurality of points. The processor may generate a second matrix, wherein the second matrix includes entries that correspond to the second distance set. The processor may remove, a portion of the points in the second distance set based on the weight of the at least one point in the plurality of points. The processor may perform a comparison of the first matrix and the second matrix, wherein the comparison uses the global structure and the local density, and construct a second point cloud using the comparison and the second matrix.

In another embodiment a non-transitory computer readable medium comprising instructions that when executed is operable to receive a first point cloud distribution, wherein the first point cloud distribution includes a global spatial structure and a local point density. The instructions may calculate a first pairwise distance set and a second pairwise distance set for the plurality of points to at least one other point in the plurality of points. The instructions may also include generating a first distance matrix, wherein the first distance matrix includes entries that correspond to the first pairwise distance set. The instructions when executed generate a second distance matrix, wherein the second distance matrix includes entries that correspond to the second pairwise distance set. The instructions when executed remove a portion of the points in the second pairwise distance set based on the weight of the at least one point in the plurality of points. The instructions when executed perform a comparison of the first distance matrix and the second distance matrix, wherein the comparison uses the global spatial structure and the local point density, and construct a second point cloud distribution using the comparison and the second distance matrix.

BRIEF DESCRIPTION OF THE DRAWINGS

Exemplary embodiments are described herein with reference to the following drawings.

FIG. 2 illustrates examples of distance matrices.

DETAILED DESCRIPTION

Figure 1:
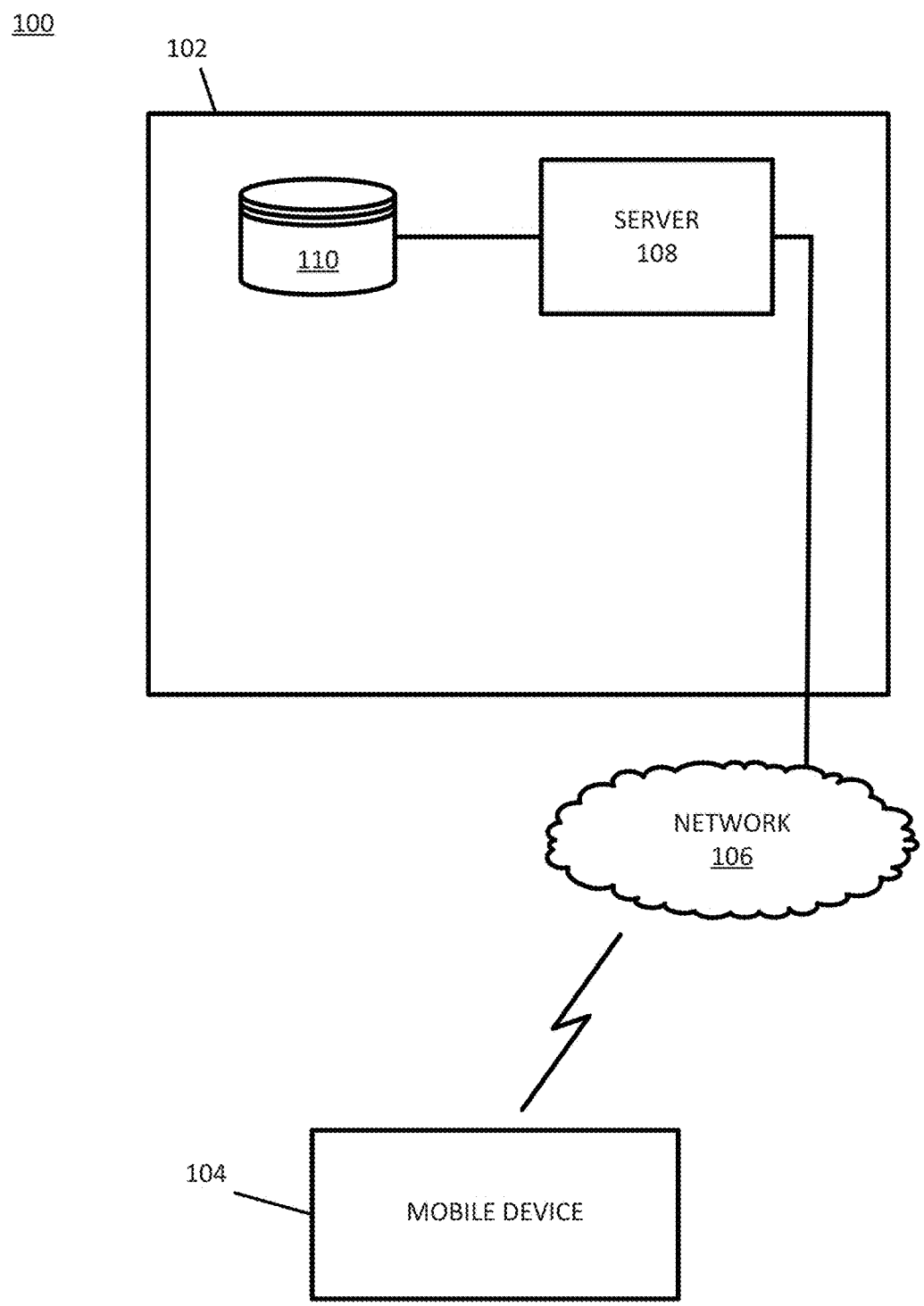
FIG. 1 illustrates an example system for simplifying a point cloud.

The following embodiments include simplification of a point cloud distribution. The systems, methods, and apparatuses include receiving a point cloud distribution, calculating the distance between each point in the point cloud and every other point in the point cloud, constructing an additional point cloud which may have the number of points in the second point cloud reduced by an amount. The two point clouds may be compared to determine the similarity between the two point clouds. The result is a simplified point cloud.

The disclosed examples simplify point cloud distributions while taking into account a global spatial structure and a local point density of the point clouds. The examples preserve spatial structure of a point cloud distribution after simplification so as to make it easier and more accurate to use the simplified point cloud distribution for object recognition, object detection, and object classification. Other uses of simplified point clouds may be object reconstruction, three dimensional information retrieval, navigation in highly automated driving systems (HAD), three dimensional modeling of landscapes, buildings, cityscapes, mapping, and modeling for navigation purposes.

The point cloud distributions have a set of multiple points, a global spatial structure and a local point density. The global spatial structure may be an outline of the point cloud distribution. For example, if a user of the system were to observe the point cloud distribution, the shape of the point cloud distribution would correspond to the global spatial structure. As another example, the global spatial structure corresponds to the outermost points that make up the point cloud distribution. These points may be indicated as part of the global spatial structure by the system. Conversely, the local point density corresponds to the density for each point that make up the point cloud distribution. For example, the local point density may correspond to the number of neighbors that a point in the point cloud has.

The disclosed embodiments preserve the information of a point cloud by maximizing the similarity of a distribution of pairwise distances between an original point cloud and a simplified point cloud. In one embodiment, a pairwise distance may be the distance from a point to a set of other points. For example, given the set of points on a number line where: A=0, B=6, and C=−2. The pairwise distance for A would be (6, 2), where 6 would be the distance from A to B, and 2 would be the distance from A to C. Similarly, the pairwise distance for B would be (6, 8), where 6 is the distance from B to A, and 8 is the distance from B to C. The disclosed embodiments use the pairwise distance for points in the point cloud in addition to the global spatial structure and local point density to maximize the similarity between the original point cloud and the simplified point cloud.

The disclosed embodiments receive an initial point cloud including a set of multiple points, a global spatial structure, and a local point density. Each point is assigned a weight which may represent the possibility of whether the point may be kept in a simplified point cloud. The weight may correspond to 1 or 0. In other embodiments, the weight may correspond to a decimal number between 0 and 1. The higher the weight is the more likely the point is kept in the point cloud simplification. In one embodiment, the initial weights are all set to one.

In one embodiment, a distance matrix is computed for the original point cloud P. The distance matrix includes entries which correspond to pairwise distances for the points in the original point cloud. For example, an entry in a matrix, M, may correspond to the Euclidean distance between $p_i$ and $p_j$, where $p_i$ and $p_j$ are points in the original point cloud. Accordingly, in matrix M the matrix entry $m_{ij}$ would be $m_{ij}=d_{ij}$ where $d_{ij}$ is the Euclidean distance between $p_i$ and $p_j$. Similarly, for a simplified point cloud P' the corresponding distance Matrix M' would contain the weighted distance for each point in the point cloud. For example, an entry in M' would be $m_{ij}'=w_i w_j d_{ij}$. The result in this example is a distance matrix M for the original point cloud and a distance matrix for the soon to be simplified point cloud M'.

The matrices M and M' may be normalized to better ensure the results of the simplified point cloud. One such example for normalizing the matrices may be calculating the summation of all entries in M and M' such that the summation of i multiplied by the summation of j multiplied the entry $m_{ij}$ is equal to one, or $\Sigma_i \Sigma_j m_{ij} = 1$, and $\Sigma_i \Sigma_j m_{ij}' = 1$.

The disclosed embodiments maximize the similarity between M and M'. One way to maximize similarity may be the Kullback-Leibler divergence to represent the similarity. Kullback-Leibler divergence is a non-symmetric measure of the difference between two probability distributions. Kullback-Leibler divergence is a measure of the information lost when one probability distribution is used to approximate another probability distribution. In one example, to measure the similarity between matrix M and matrix M', the similarity may be represented as S where S is equal to Equation 1 below:

$$S = \sum_i \sum_j d_{ij} \log \frac{d_{ij}}{w_i w_j d_{ij}} + w_i w_j d_{ij} \log \frac{w_i w_j d_{ij}}{d_{ij}} \quad \text{(Eq. 1)}$$

In Eq. 1 double summation is used because to calculate the similarity S between matrix M and matrix M' all entries in the matrix must be summed. The equation takes the summation of all points in the point cloud multiplied by the Euclidean distance for each point in the matrix to every other point in the cloud, multiplied by the logarithm of the fraction of the distance from each point to every other point divided by the distance from each point to every other point multiplied by each point's respectively assigned weights, plus the weighted points multiplied by each point's distances, multiplied by the logarithm (e.g., $\log_{10}$) of the weighted points multiplied by each point's distance over each point's distance. In the equation i and j represent the points in the point cloud, w represents the weight assigned to a particular point i or j, and d represents the Euclidean distance between a point i and j.

Eq. 1 may result in a non-uniform distribution of points for the simplified point cloud. In an effort to maintain the similarity between the original point cloud and the simplified point cloud the local point density of the point cloud may be taken into account. One way to measure the local point density of the original point cloud as compared to the simplified is by counting the number of neighbors to a point in the point cloud. Using this measure of local point density for a point the system may then use a down-sampling ratio (a ratio that may be used to determine what percentage of an original point cloud to remove) to determine what percentage of points to keep after downsizing. The down sampling ratio may then be multiplied by the number of neighbors for a point in the original set to see how many neighbors the same point in a simplified point cloud would need to maintain the same local point density. For example, if a point has fourteen neighbors and the down sampling ratio is 0.5 then the point in a simplified point cloud should have seven neighbors.

By taking into consideration the number of neighbors for a point in the point cloud, $k_i$, and the number of neighbors of the local point that remain in the simplified point cloud as $k_i'$, Eq. 1 may be modified to be:

$$S = \beta \sum_i \sum_j d_{ij} \log \frac{d_{ij}}{w_i w_j d_{ij}} + w_i w_j d_{ij} \log \frac{w_i w_j d_{ij}}{d_{ij}} + (1-\beta) \sum_i \left(\frac{k_i'}{k} - r\right)^2 \quad \text{(Eq. 2)}$$

Here the simplification ratio, r, may be computed as the absolute value of P', the simplified point cloud, divided by the original point cloud P, or r=|P'|/|P|. Eq. 2 takes into consideration the local point density of each point in the point cloud. By taking into account the local point density of each point in the point cloud the results of Eq. 2 are more accurate than the results of Eq. 1. The simplified point cloud that is constructed by using Eq. 2 is a more accurate representation of the original point cloud. The beta β in Eq. 2 may correspond to a regularization term to prevent overfitting or preventing the inclusion of random error or noise instead of the underlying relationship between the two point clouds. Eq. 2 takes into consideration the local point density by the third operand $$(1-\beta) \sum_i \left(\frac{ki'}{k} - r\right)^2.$$

Here β is the regularization term, i is the point in the point cloud, $k_i$ is the number of neighbors for the point in the point cloud, $k_i'$ is the number of neighbors for the point in the simplified point cloud, and r is the simplification ratio. Eq. 2 provides a better similarity score, S, than Eq. 1 because it takes into consideration both the global spatial structure and the local point density.

The embodiments disclosed produce a simplified point cloud that is more accurate than previous disclosures because the embodiments take into account the local point density and global spatial structure of the original point cloud. The embodiments keep the local density of each point proportional to the original point cloud. By keeping the local density of each point proportional to the original point cloud the sub-sampled point cloud obtained keeps the characteristics of the original point cloud and could be used in most shape matching and information retrieval tasks. Point clouds are simplified so that less processing power is required to manipulate and analyze the point cloud without losing accuracy as to what the original point cloud represents.

FIG. 1 illustrates an example system 100 for simplifying a point cloud. The system 100 may include a navigation device 102, a mobile device 104, a network 106, a server 108, and a database 110. In some embodiments the mobile device may not be needed. In other embodiments the navigation device is a LiDAR system which may be mounted on a vehicle, or incorporated into a HAD system. For example, the navigation device, or mobile device, may be included in the HAD system. In other embodiments the simplification of a point cloud occurs at the server 108 and the simplified point cloud is sent to the mobile device 104 over the network 106. In yet other embodiments, the mobile device 104 collects the LiDAR data and transmits it over the network 106 to the server 108 for processing. In other embodiments the simplification of the point cloud includes accessing stored point clouds in the database 110.

Figure 4:
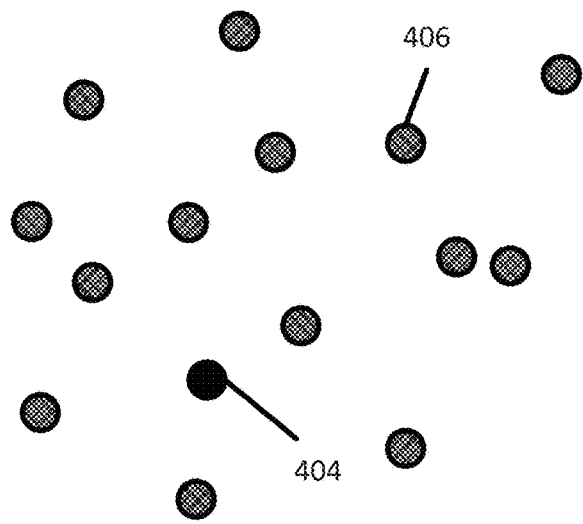
FIG. 4 illustrates an example point cloud and simplified point cloud.
Figure 4:
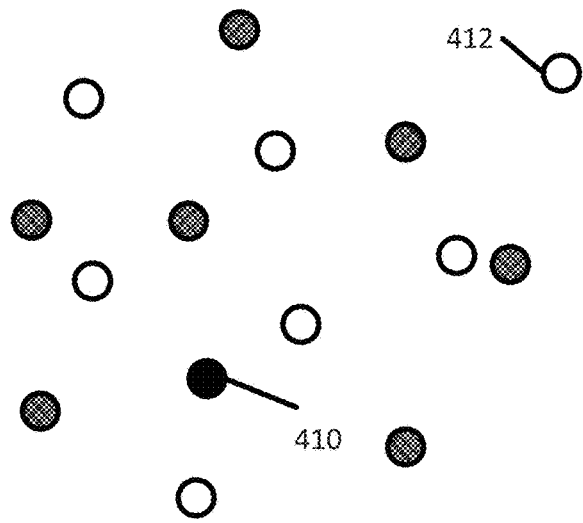
Figure 6:
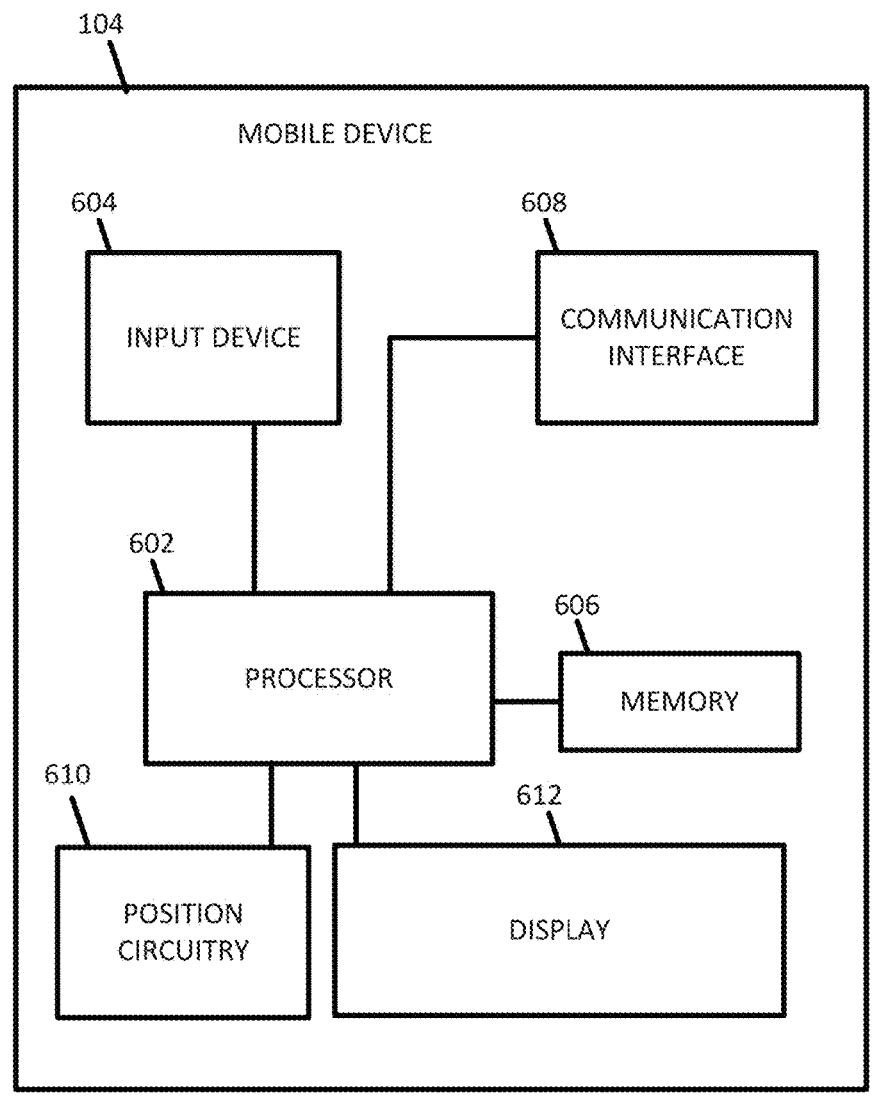
FIG. 6 illustrates an example mobile device for simplifying a point cloud.
Figure 8:
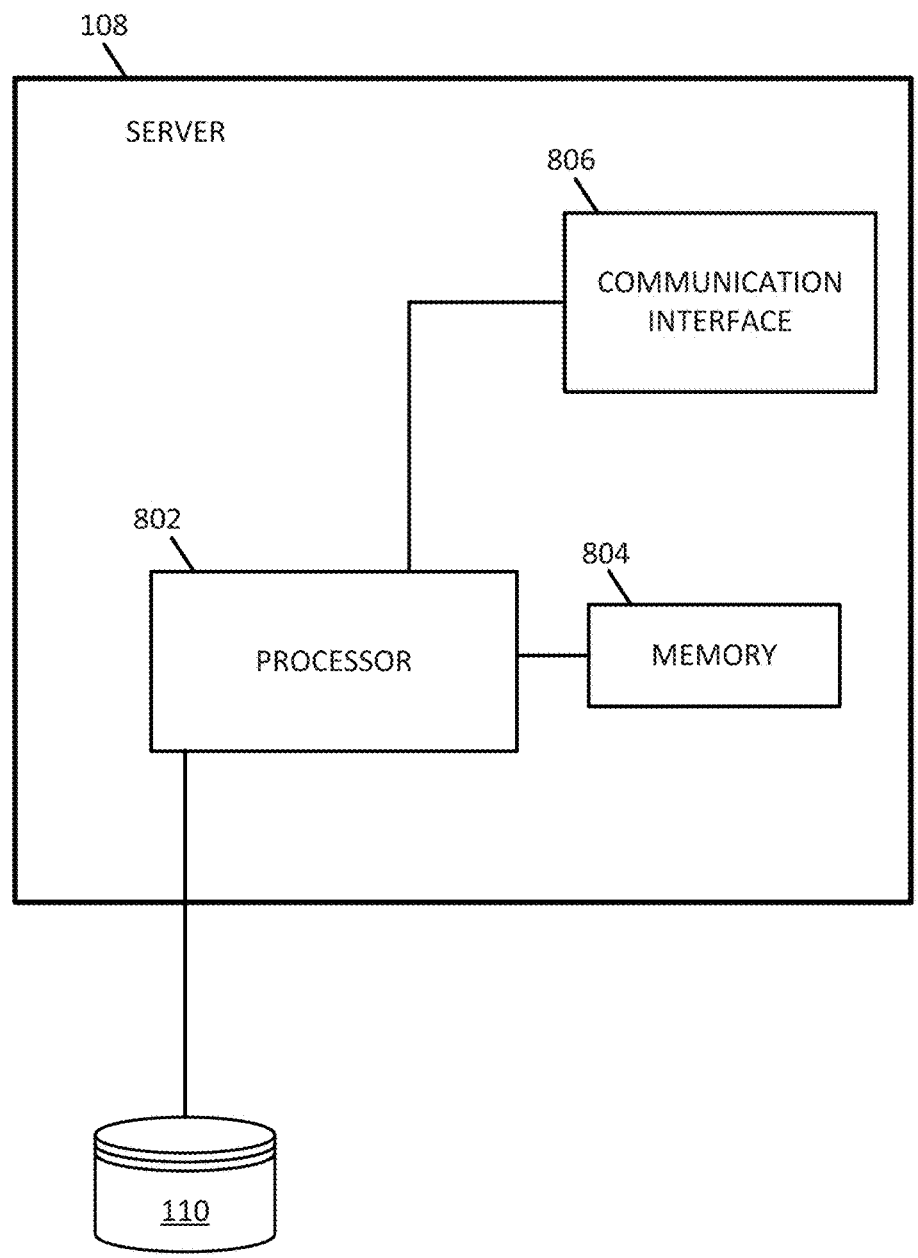
FIG. 8 illustrates an example server for simplifying a point cloud.

The system 100, or navigation device 102, mobile device 104, or server 108 may use the acts depicted in the flowcharts in FIG. 4, 6, or 8 to simplify a point cloud. In one embodiment the mobile device, or navigation device (hereinafter the mobile device) may receive a first point cloud. The point cloud may include a set of multiple points, a global spatial structure, and a local point density. The point cloud data may be collected by the mobile device, or in some embodiments the navigation device. Using the point cloud data the mobile device may calculate a first pairwise distance set for the set of multiple points in the point cloud. The mobile device may generate a first distance matrix using the first pairwise distance set by using the pairwise distance sets as entries in the first distance matrix.

The mobile device may calculate a second pairwise distance set for the set of multiple points where the multiple points have a weight assigned to them. The weight assigned to them may be assigned randomly, or by some other method. The mobile device may generate a second distance matrix using the second pairwise distance set including the weights.

The mobile device may remove a portion of the points in the second pairwise set based on the weight associated with the points. For example, if a point has a weight of one that point would not be removed from the set, however, if the point had a weight of zero that point would be removed from the set. The portion removed may be random, may be set by a user of the system, or may change with each iteration of the method. In some embodiments the portion removed is one half. In other embodiments it may be more or less depending on storage and processing requirements of the mobile device.

The mobile device may perform a comparison of the first distance matrix and the second distance matrix. The comparison may take into consideration the global spatial structure and the local point density. In some embodiments the comparison may be performed by using the equation listed in Eq. 1 or Eq. 2. In other embodiments other comparison methods may be used.

The mobile device may construct a second point cloud using the comparison and the second distance matrix. The mobile device may provide the second point cloud to another mobile device, a navigation device, or a server. In some embodiments the second point cloud is provided when the comparison is within a particular threshold. The threshold may be user or system defined. In some embodiments, the threshold may indicate that the similarity score between the first and second distance matrix has to maintain a particular down-sampling ratio related to the number of neighbors that a point in the point cloud has.

In some embodiments, the acts depicted in FIG. 4 are repeated until the comparison between the first and second distance matrices is within a particular threshold. The mobile device may remove additional portions of points from the set of multiple points in the point cloud, update the second distance matrix, and perform an additional comparison of the first distance matrix and the second distance matrix. The mobile device may repeat the aforementioned steps reducing the size of the second point cloud reaches a certain size requirement, or similarity requirement.

FIG. 2 illustrates example distance matrices 202 and 208 that may be used by the mobile device 104. The distance matrices include points, an example being A at 204, distance values 206, and in some instances a weight value 210. In FIG. 2, distance matrix 202 may correspond to a first distance matrix and a received point cloud distribution. The distance matrix 208 may correspond to a second distance matrix and includes the weights 210 for the corresponding points. In some embodiments the mobile device constructs these matrices, in other embodiments the server, or navigation device constructs these matrices.

Figure 3:
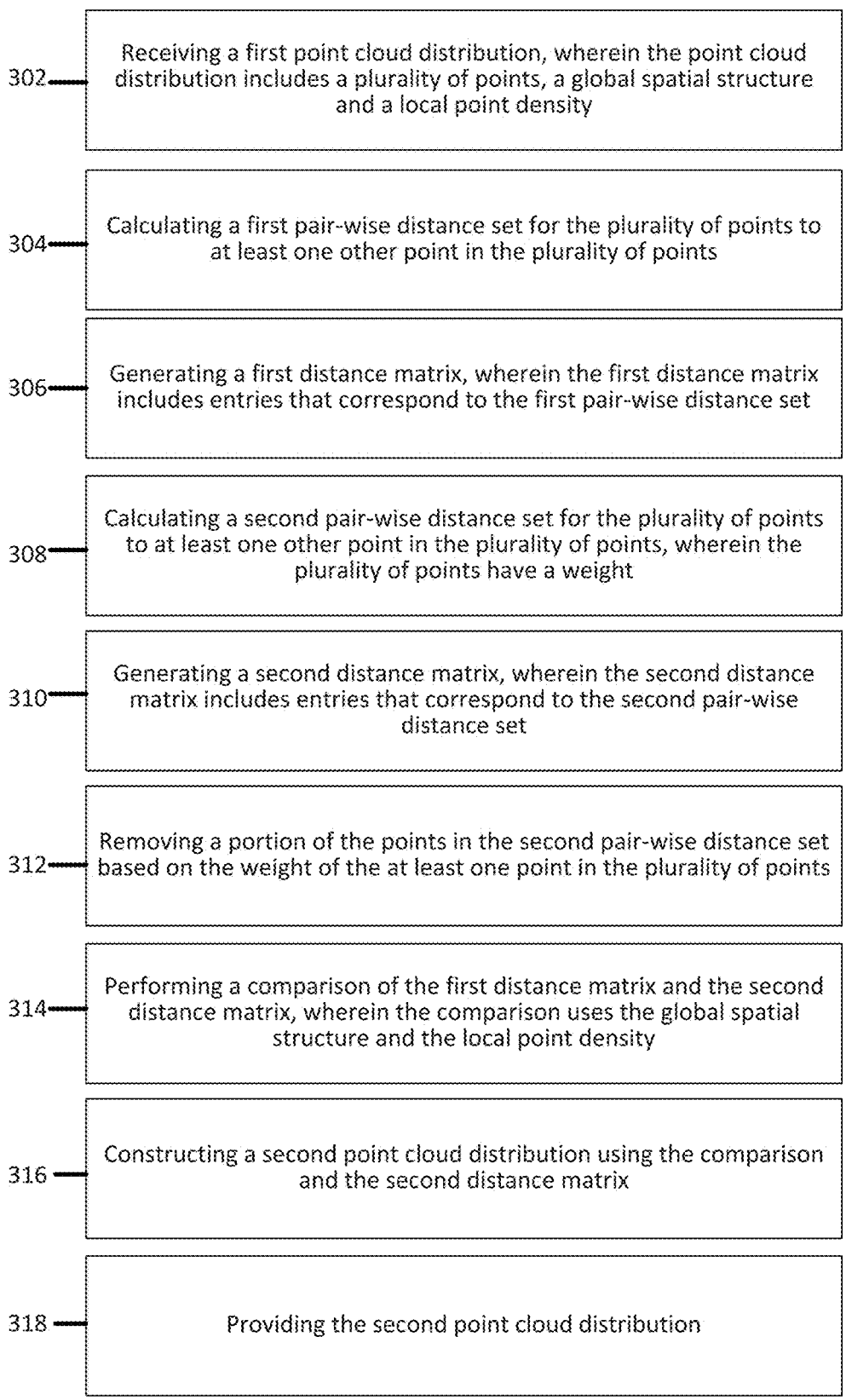
FIG. 3 illustrates an example flowchart for simplifying a point cloud.

FIG. 3 illustrates an example flowchart for simplifying a point cloud. At act 302 a mobile device receives a first point cloud distribution. The point cloud distribution includes a set of multiple points, a global spatial structure and a local point density. The mobile device calculates a first pairwise distance set for the set of multiple points to at least one other point in the set of multiple points. The mobile device may generate a first distance matrix. The first distance matrix includes entries that correspond to the first pairwise distance set. The mobile device may calculate a second pairwise distance set for the set of multiple points to at least one other point in the set of multiple points. The set of multiple points have a weight associated with them. The mobile device may generate a second distance matrix. The second distance matrix includes entries that correspond to the second pairwise distance set. The mobile device may remove a portion of the points in the second pairwise distance set based on the weight of the at least one point in the set of multiple points. The mobile device may perform a comparison of the first distance matrix and the second distance matrix. The comparison uses the global spatial structure and the local point density. The mobile device may construct a second point cloud distribution using the comparison and the second distance matrix. The mobile device may provide the second point cloud distribution.

FIG. 4 illustrates two example point cloud distributions 402 and 408. Point cloud distribution 402 includes a point of interest 404 and an example neighbor point 406. Point cloud distribution 408 includes a point of interest 410, and a neighbor point 412 which has been removed from the pairwise set for point of interest 410. The point 412 was removed for having a weight of zero. In the example point cloud distributions point cloud 402 shows point of interest 404 which has fourteen neighbor points one of which being neighbor point 406. After the point cloud 402 is simplified point cloud 408 may be produced. Point cloud 408 has point of interest 410 which has a total seven neighbor points. Assuming that the down-sampling ratio for the point cloud simplification process is one half then the point cloud 408 would maintain the local point density of point cloud 402. Point cloud 408 is the result of using Eq. 2 listed above and maintains the local point density proportional to the point cloud 402. Using Eq. 2 results in a point cloud that is more accurate to an original point cloud than using a random distribution method (e.g. where points are randomly removed regardless of local point density, or global spatial structure), or a Gaussian distribution method (e.g. where points are removed based on where they fall along a normal distribution of the points).

Figure 5:
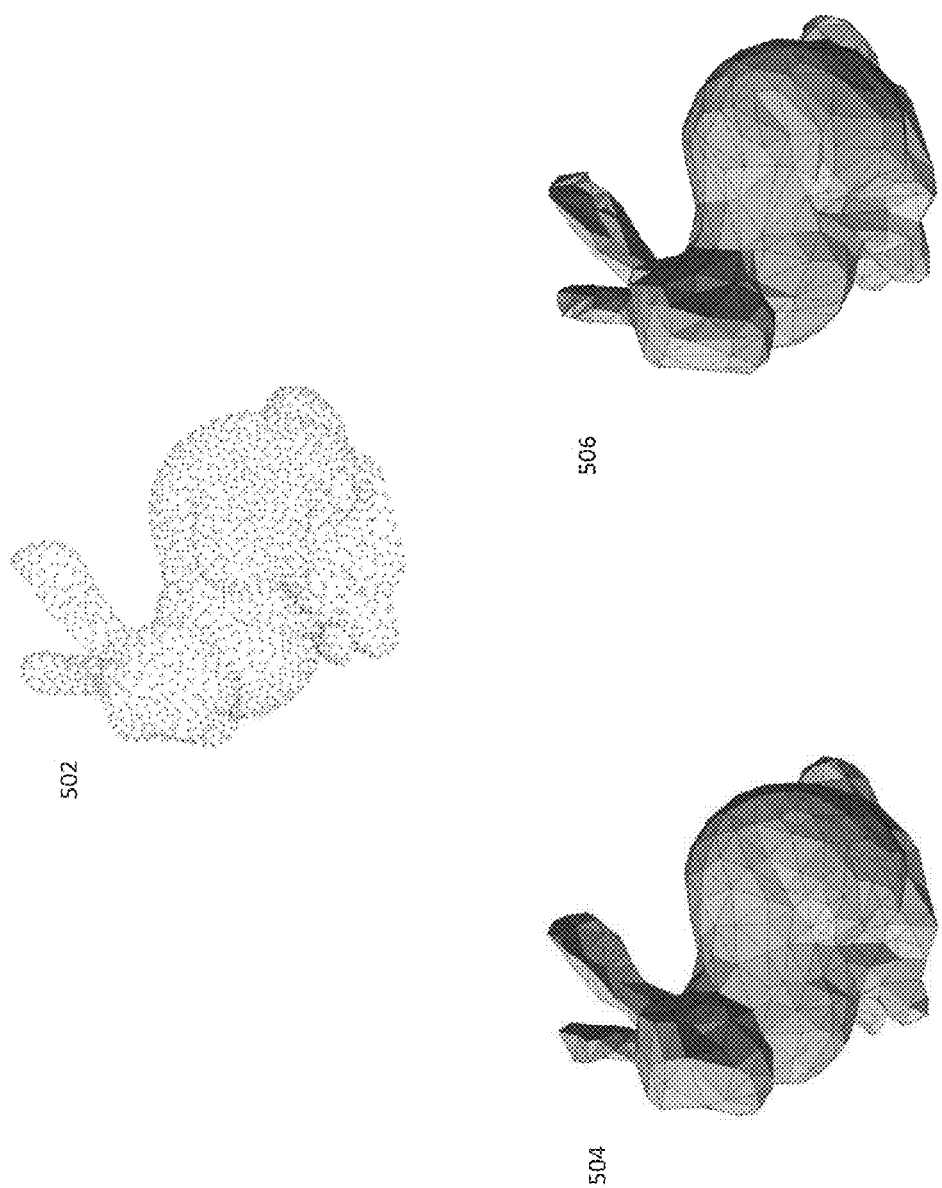
FIG. 5 illustrates an example point cloud and simplified point cloud using a mesh.

FIG. 5 illustrates example mesh constructions. Object 502 represents a point cloud that corresponds to a rabbit. The point cloud distribution may be three dimensional and include such features as the rabbit's ears and eyes. The rabbit depicted by object 504 is derived from a point cloud using the embodiments disclosed herein. The rabbit depicted in object 506 uses a quadratic mesh technique. Object 504 may be the result of a simplified point cloud representing the rabbit of object 502. The simplified point cloud may have the various points remaining of the original point cloud that constitute the simplified point cloud connected together to form a mesh like structure. The mesh like structure will be a more accurate representation of the object 502 than previous methods, because the embodiments disclosed herein take into account global spatial structure and local point density. As such, the object 504 retains the important features of object 502, such as the rabbit's ears and eyes. Conversely, object 506 uses the quadratic edge collapse mesh decimation technique which collapses particular edges formed by connecting points in the point cloud to reduce the mesh size, and does not retain the rabbit's features as well as object 504.

FIG. 6 illustrates an example mobile device 104 for receiving and processing point cloud data. The mobile device 104 includes a processor 602, an input device 604, a memory 606, a communication interface 608, a position circuitry 610, and a display 612. Additional, different, or fewer components may be provided. The mobile device may receive point cloud data from the input device 604, or the position circuitry 610. Additionally, point cloud data may be stored in the memory 606, or accessed from the memory. The processor 602 may simplify point cloud data alone, or in conjunction with the memory 606. In other embodiments the processor 602 may simplify the point cloud data in conjunction with a server, like the server 108 of FIG. 1. The communication interface 608 may be used to communicate point cloud data to a server over a network, such as the network 106 of FIG. 1. The display 612 may be used to display point cloud data.

The mobile device 104 may be a personal navigation device ("PND"), a portable navigation device smart phone, a mobile phone, a personal digital assistant ("PDA"), a tablet computer, a notebook computer, a LiDAR system, and/or any other known or later developed mobile device or personal computer. Non-limiting embodiments of mobile devices may also include RDS devices, HD radio devices, mobile phone devices, or car navigation devices such as Garmin or TomTom.

Figure 7:
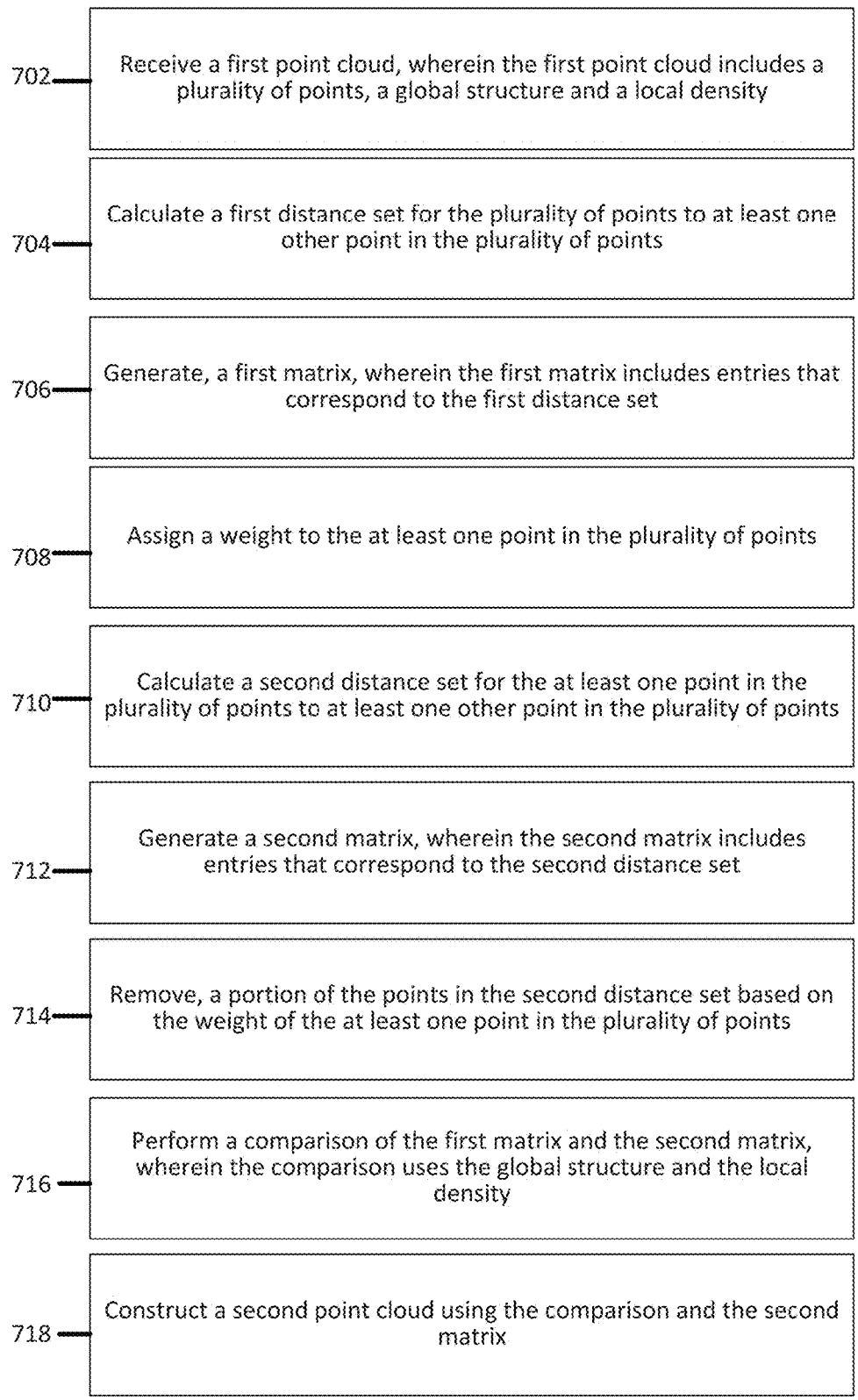
FIG. 7 illustrates an example flowchart for using the mobile device of FIG. 6.

FIG. 7 illustrates an example set of acts for using the mobile device 104 of FIG. 6. Additional, different, or fewer acts are possible for the method. At act 702 the processor 602 may be configured to receive a first point cloud. The first point cloud includes a set of multiple points, a global structure and a local density. The point cloud data may be collected by the input device 604, the position circuitry 610, accessed from memory 606, or received through the communication interface 608. At act 704 the processor 602 may calculate a first distance set for the set of multiple points to at least one other point in the set of multiple points. In some embodiments the distance set corresponds to the distance from each point in the set of multiple points to each other point in the set of multiple points.

At act 706 the processor may generate, a first matrix. The first matrix includes entries that correspond to the first distance set. The first matrix corresponds to the set of multiple points and is a representation of the first point cloud. In some embodiments, the matrix may be two-dimensional, in other embodiments the matrix may be three-dimensional, or the matrix may have more than three dimensions. At act 708 the processor may assign a weight to the at least one point in the set of multiple points. The weight may be zero or one. In some embodiments the weight may be a decimal number between zero and one. At act 710 the processor may calculate a second distance set for the at least one point in the set of multiple points to at least one other point in the set of multiple points. The second distance set may be similar in structure to the first distance set.

At act 712 the processor may generate a second matrix. The second matrix includes entries that correspond to the second distance set. The second matrix may share the same characteristics as the first matrix, except in some embodiments the second matrix may have the weight assigned to the point included in the entries to the second matrix. At act 714 the processor may remove, a portion of the points in the second distance set based on the weight of the at least one point in the set of multiple points. In some embodiments the processor removes at least half of the points. In other embodiments the processor removes a variable proportion of the points depending on the characteristics of the second matrix. At act 716 the processor may perform a comparison of the first matrix and the second matrix. The comparison uses the global structure and the local density. The comparison may be performed using a similarity formula such as the similarity formula depicted in Eq. 1 or Eq. 2. In other embodiments a different formula is used. At act 718 the processor may construct a second point cloud using the comparison and the second matrix. The second point cloud is a simplified point cloud derived from the original point cloud. In other embodiments the processor may perform the acts above in conjunction with a server, such as the server 108 of FIG. 1. In other embodiments the mobile device 104 of FIG. 6 may provide the second point cloud to another mobile device or server using the communication interface 608.

FIG. 8 illustrates an exemplary server 108 of the system of FIG. 1. The server 108 includes a processor 802, a communication interface 806, and a memory 804. The server 108 may be coupled to a database 108. The communication interface 806 may be an input device for the server 108. In certain embodiments, the communication interface 806 may receive point cloud data collected from the mobile device 104, or the navigation device 102 of FIG. 1.

The server processor 802 may include a general processor, digital signal processor, an application specific integrated circuit (ASIC), field programmable gate array (FPGA), analog circuit, digital circuit, combinations thereof, or other now known or later developed processor. The server processor 802 may be a single device or combinations of devices, such as associated with a network, distributed processing, or cloud computing.

The server processor 802 may also be configured to cause an apparatus to at least perform at least one of methods described above. For example, the navigation device 102 or mobile device 104 may be configured to collect and transmit point cloud data collected along a roadway.

The memory 804 may be a volatile memory or a non-volatile memory. The memory 804 may include one or more of a read only memory (ROM), random access memory (RAM), a flash memory, an electronic erasable program read only memory (EEPROM), or other type of memory.

The communication interface 806 may include any operable connection. An operable connection may be one in which signals, physical communications, and/or logical communications may be sent and/or received. An operable connection may include a physical interface, an electrical interface, and/or a data interface. The communication interface 806 provides for wireless and/or wired communications in any now known or later developed format.

Figure 9:
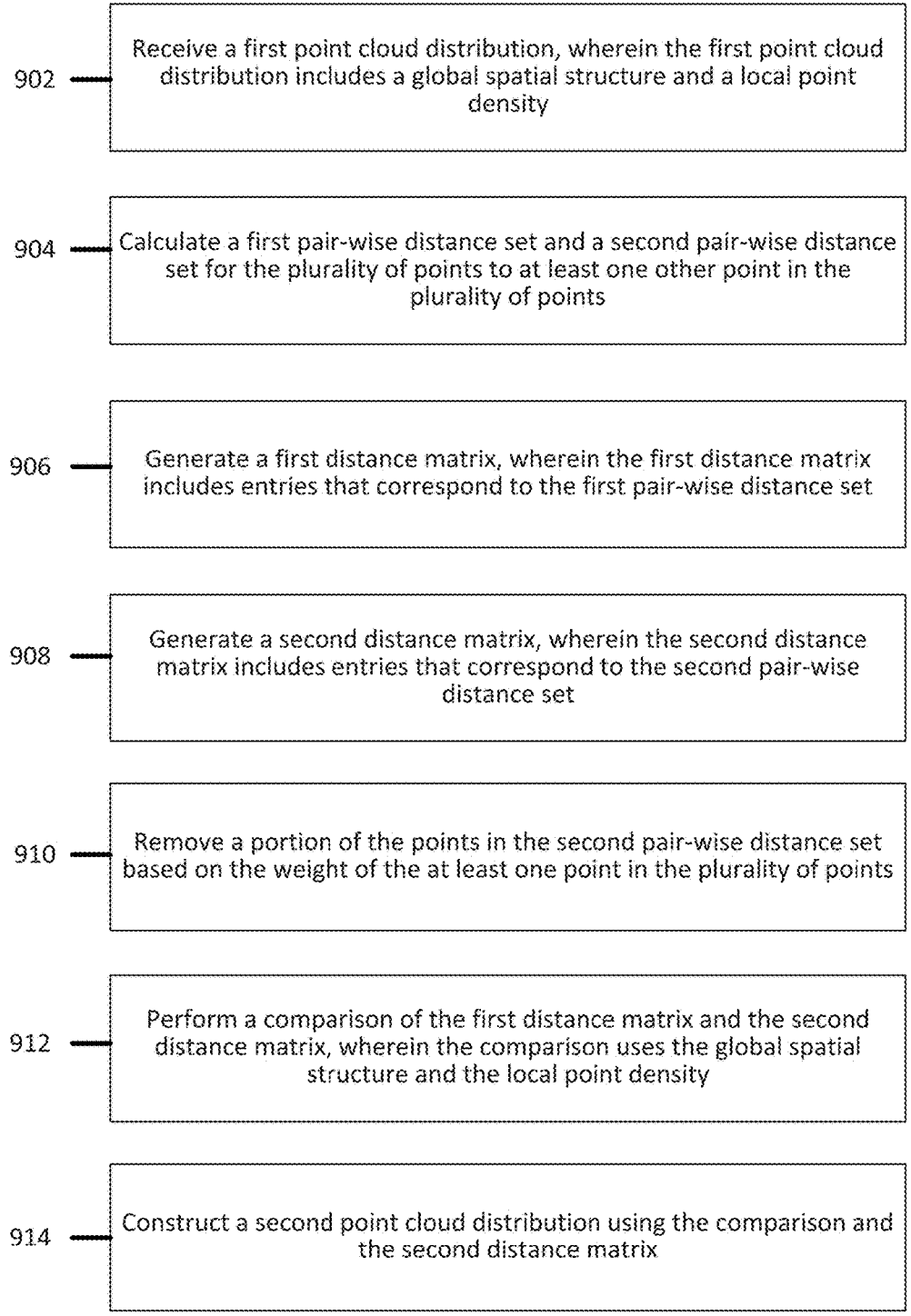
FIG. 9 illustrates an example flowchart for using the server of FIG. 9 for simplifying a point cloud.

FIG. 9 is an example set of acts for simplifying point cloud data with the server 108 of FIG. 8. Additional, different, or fewer acts are possible for the method. At act 902 the processor 802 may receive a first point cloud distribution. The first point cloud distribution includes a set of multiple points, a global spatial structure, and a local point density. The point cloud distribution may be a two dimensional distribution, a three dimensional distribution, or some other type of distribution. The point cloud data may be received from the communication interface 806, memory 804, or the database 110. In some embodiments the point cloud data is historical point cloud data, and in other embodiments the point cloud data is collected in real time by a LiDAR system, mobile device, or navigation device. At act 904 the processor 802 may calculate a first pairwise distance set and a second pairwise distance set for the set of multiple points to at least one other point in the set of multiple points. The first and second pairwise distance sets may have the same structure.

At act 906 the processor may generate a first distance matrix. The first distance matrix includes entries that correspond to the first pairwise distance set. The first distance matrix may represent the distance from each point in the point cloud distribution to each other point in the point cloud distribution. At act 908 the processor may generate a second distance matrix. The second distance matrix includes entries that correspond to the second pairwise distance set. The second distance matrix may be used to form the simplified point cloud distribution. The second distance matrix may include the weight assigned to each point in the entries in the second distance matrix. At act 910 the processor may remove a portion of the points in the second pairwise distance set based on the weight of the at least one point in the set of multiple points. In some embodiments at least half the points are removed in the second pairwise distance set. At act 912 the processor may perform a comparison of the first distance matrix and the second distance matrix. The comparison uses the global spatial structure and the local point density. If the comparison results in the second distance matrix not being within a particular threshold value the removing and comparing steps may be repeated until the particular threshold is met. At act 914 the processor 802 may construct a second point cloud distribution using the comparison and the second distance matrix. The processor 802 may perform the acts described in FIG. 9 in conjunction with a mobile device, or a navigation device connected to the server 108 via the network 106. The processor 802 may also provide the second point cloud distribution to a mobile device or server via the communication interface 806.

In the above described embodiments, the network 106 may include wired networks, wireless networks, or combinations thereof. The wireless network may be a cellular telephone network, an 802.11, 802.16, 802.20, or WiMax network. Further, the network 106 may be a public network, such as the Internet, a private network, such as an intranet, or combinations thereof, and may utilize a variety of networking protocols now available or later developed including, but not limited to TCP/IP based networking protocols.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term "circuitry" or "circuit" refers to all of the following: (a)hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., E PROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

In some embodiments, the vehicle containing the navigation device is an autonomous vehicle or a highly automated driving (HAD) vehicle. As described herein, an "autonomous vehicle" may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes.

As described herein, a "highly automated driving (HAD) vehicle" may refer to a vehicle that does not completely replace the human operator. Instead, in a highly automated driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible.

The autonomous or highly automated driving vehicle may include vehicle sensors for identifying the surroundings and the location of the car. The sensors may include GPS, LIDAR, radar, and cameras for computer vision. Proximity sensors may aid in parking the vehicle. The proximity sensors may detect the curb or adjacent vehicles. The autonomous or highly automated driving vehicle may optically track and follow lane markings or guide markings on the road.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
   receiving, using a processor, a first point cloud distribution from a sensor configured to detect the surroundings of a vehicle, wherein the point cloud distribution includes a plurality of points, a global spatial structure and a local point density;
   calculating, using the processor, a first pairwise distance set for the plurality of points to at least one other point in the plurality of points;
   generating, using the processor, a first distance matrix, wherein the first distance matrix includes entries that correspond to the first pairwise distance set;
   calculating, using the processor, a second pairwise distance set for the plurality of points to at least one other point in the plurality of points, wherein the plurality of points have a weight;
   generating, using the processor, a second distance matrix, wherein the second distance matrix includes entries that correspond to the second pairwise distance set;
   removing, using the processor, a portion of the points in the second pairwise distance set based on the weight of the at least one point in the plurality of points;
   performing, using the processor, a comparison of the first distance matrix and the second distance matrix, wherein the comparison uses the global spatial structure and the local point density;
   constructing, using the processor, a second point cloud distribution using the comparison and the second distance matrix; and
   providing, using the processor, the second point cloud distribution to a navigation device.

2. The method of claim 1, wherein the weight is one or zero.

3. The method of claim 1, wherein the second point cloud distribution is provided when a result of the comparison is within a threshold.

4. The method of claim 1, further comprising:
   removing, using the processor, a second portion of the points in the second pairwise distance set based on one or more new weights for the plurality of points;
   updating, using the processor, the second distance matrix; and
   performing, using the processor, a second comparison of the first distance matrix and the second distance matrix with the second portion removed.

5. The method of claim 1, wherein performing the comparison further comprises:
   calculating a summation of the entries in the first distance matrix and second distance matrix.

6. The method of claim 1, wherein performing the comparison further comprises:
   performing, using the processor, a calculation including a summation of the entries in the first distance matrix and the second distance matrix;
   identifying a first neighbor set for each point in the plurality of points, and a second neighbor set for the at least one point in the second pairwise distance set; and
   adjusting the calculation by a ratio of the first neighbor set and the second neighbor set.

7. The method of claim 1, further comprising:
   normalizing the first distance matrix and the second distance matrix.

8. The method of claim 1, wherein the portion removed includes at least half of the points in the second pairwise set.

9. The method of claim 1, wherein the global spatial structure is an outline of the first point cloud distribution, and the local point density is a measure of the density of the plurality of points.

10. The method of claim 9, wherein the comparison includes the global spatial structure being within a first predefined threshold and local point density being within a second predefined threshold.

11. The method of claim 10, wherein if the global spatial structure and local point density are not within the first and second predefined threshold, further comprising:
    removing, using the processor, a second portion of the points in the second pairwise distance set based on one or more new weights for the plurality of points;
    updating, using the processor, the second distance matrix; and
    performing, using the processor, a second comparison of the first distance matrix and the second distance matrix with the second portion removed.

12. An apparatus comprising:
    at least one processor; and
    at least one memory including computer program code for one or more programs; the at least one memory and the computer program code configured to, with the at least one processor, cause the apparatus to at least perform:
    receive a first point cloud from a sensor configured to detect the surroundings of a vehicle, wherein the first point cloud includes a plurality of points, a global structure and a local density;
    calculate a first distance set for the plurality of points to at least one other point in the plurality of points;
    generate, a first matrix, wherein the first matrix includes entries that correspond to the first distance set;
    assign a weight to the at least one point in the plurality of points;
    calculate a second distance set for the at least one point in the plurality of points to at least one other point in the plurality of points;
    generate a second matrix, wherein the second matrix includes entries that correspond to the second distance set;
    remove, a portion of the points in the second distance set based on the weight of the at least one point in the plurality of points;
    perform a comparison of the first matrix and the second matrix, wherein the comparison uses the global structure and the local density;
    construct a second point cloud using the comparison and the second matrix; and
    output the second point cloud to a navigation device.

13. The apparatus of claim 12, wherein the second matrix is provided if a result of the comparison is within a threshold, and if the result of the comparison is not within the threshold repeating the method until the comparison is within a threshold, further cause the apparatus to at least perform:
  remove a second portion of the points in the second distance set based on one or more new weights for the plurality of points;
  update the second matrix; and
  perform a second comparison of the first matrix and the second matrix with the second portion removed.

14. The apparatus of claim 12, wherein perform further comprises:
  perform a calculation including a summation of all entries in the first matrix and the second matrix;
  identify a first neighbor set for each point in the plurality of points, and a second neighbor set for the at least one point in the second distance set; and
  adjust the calculation by a ratio of the first neighbor set and the second neighbor set.

15. The apparatus of claim 12, wherein the comparison includes normalize the first matrix and second matrix.

16. The apparatus of claim 12, wherein the portion removed includes at least half of the points in the second distance set, and wherein the comparison includes the global structure being within a first predefined threshold and local density being within a second predefined threshold.

17. The apparatus of claim 16, wherein if the global structure and local density are not with the first and second predefined threshold causing the apparatus to:
  remove a second portion of the points in the second distance set based on one or more new weights for the plurality of points;
  update the second matrix; and
  perform a second comparison of the first matrix and the second matrix with the second portion removed.

18. A non-transitory computer readable medium comprising instructions that when executed are operable to:
  receive a first point cloud distribution from a sensor configured to detect the surroundings of a vehicle, wherein the first point cloud distribution includes a global spatial structure and a local point density;
  calculate a first pairwise distance set and a second pairwise distance set for the plurality of points to at least one other point in the plurality of points;
  generate a first distance matrix, wherein the first distance matrix includes entries that correspond to the first pairwise distance set;
  generate a second distance matrix, wherein the second distance matrix includes entries that correspond to the second pairwise distance set;
  remove a portion of the points in the second pairwise distance set based on the weight of the at least one point in the plurality of points;
  perform a comparison of the first distance matrix and the second distance matrix, wherein the comparison uses the global spatial structure and the local point density; and
  construct a second point cloud distribution using the comparison and the second distance matrix.

19. The non-transitory computer readable medium of claim 18, wherein the comparison further comprises:
  perform a calculation, wherein the calculation includes a summation of all entries in the first distance matrix and the second distance matrix;
  identify a first neighbor set for each point in the plurality of points, and a second neighbor set for the at least one point in the second pairwise distance set; and
  adjust the calculation by a ratio of the first neighbor set and the second neighbor set.

20. The non-transitory computer readable medium of claim 18, wherein if the global spatial density and the local point density are not within a first and second predefined threshold, wherein the comparison further comprises:
  remove a second portion of the points in the second distance set based on one or more new weights for the plurality of points;
  update the second matrix; and
  perform a second comparison of the first matrix and the second matrix with the second portion removed.

* * * * *